Oct. 19, 1954  G. E. MASON  2,691,835
EXCAVATING SCRAPER BOWL CONSTRUCTION
Filed March 20, 1950  3 Sheets-Sheet 1
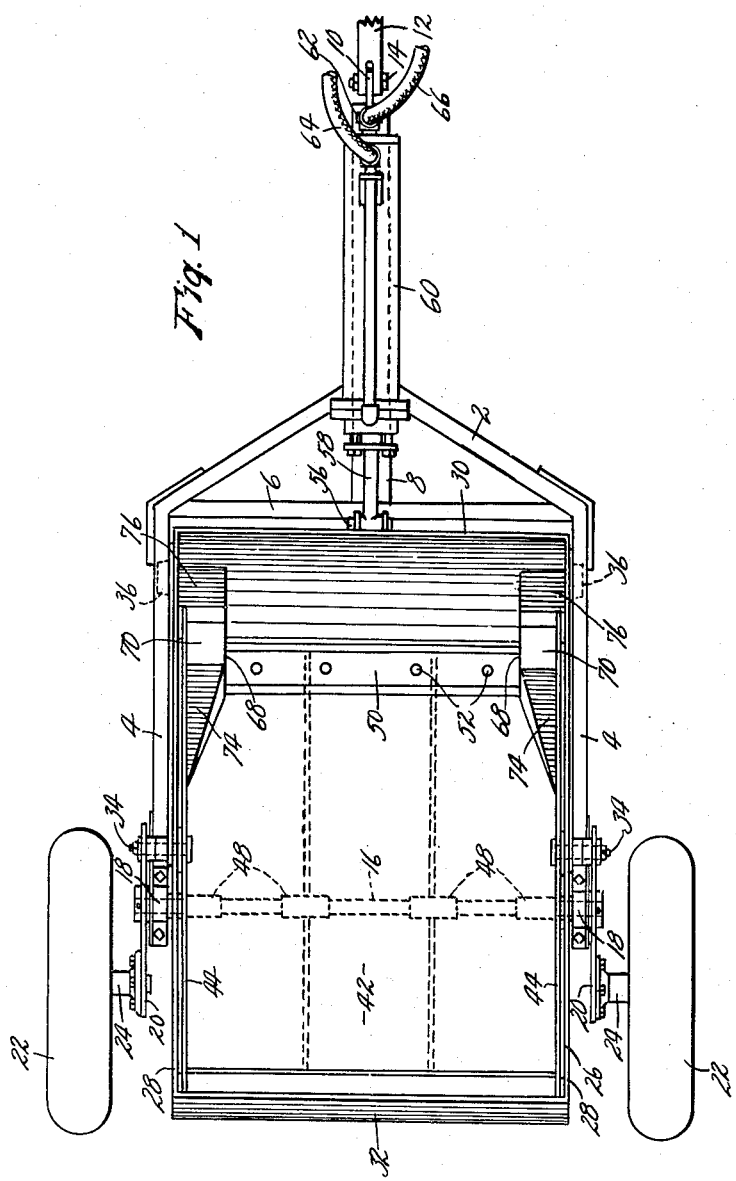
INVENTOR,
Glen E. Mason.
BY Hamilton & Hamilton,
Attorneys.

Oct. 19, 1954   G. E. MASON   2,691,835
EXCAVATING SCRAPER BOWL CONSTRUCTION
Filed March 20, 1950   3 Sheets-Sheet 2
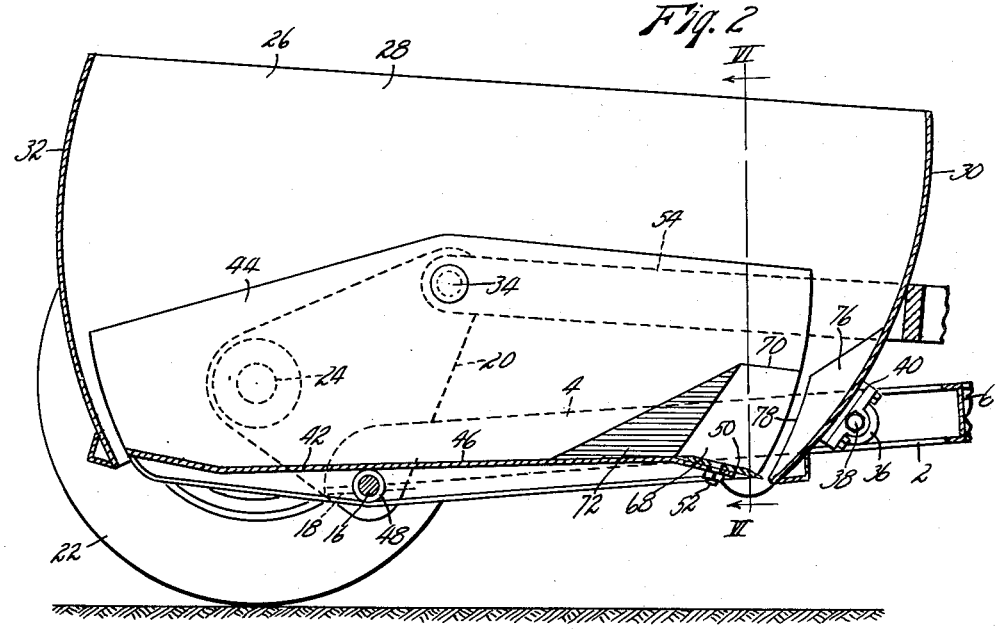
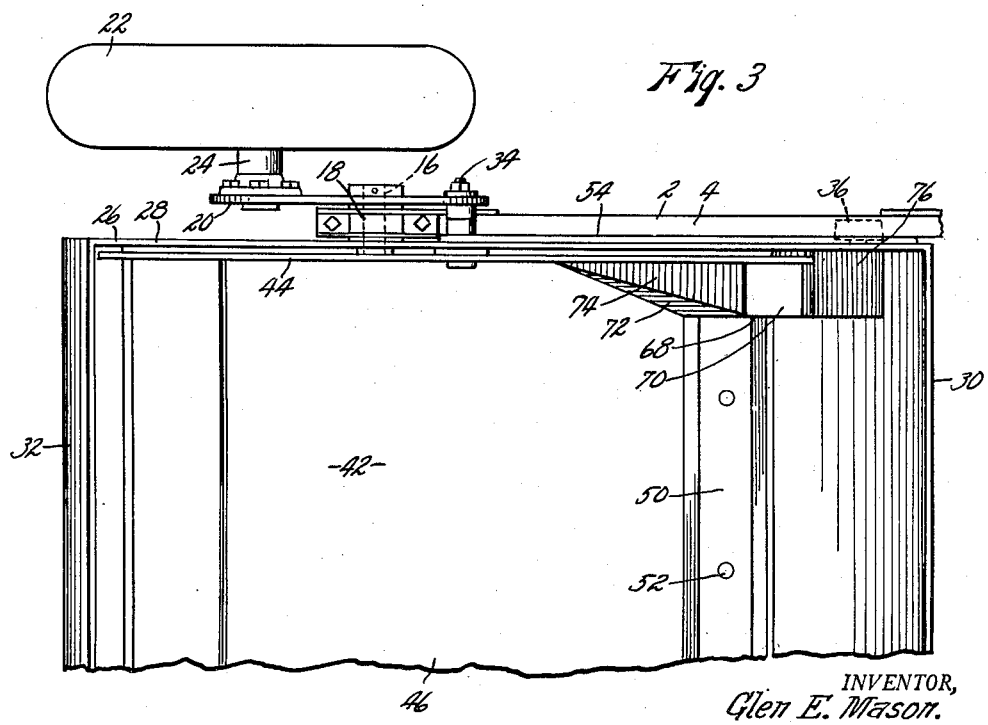
INVENTOR,
Glen E. Mason.
BY Hamilton & Hamilton,
Attorneys.

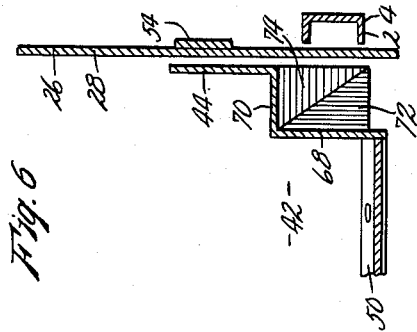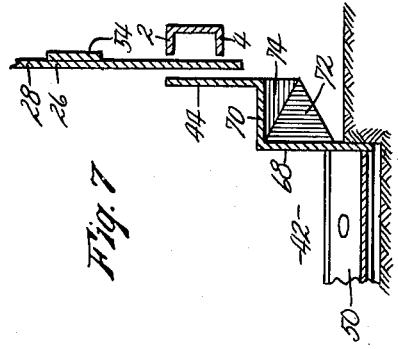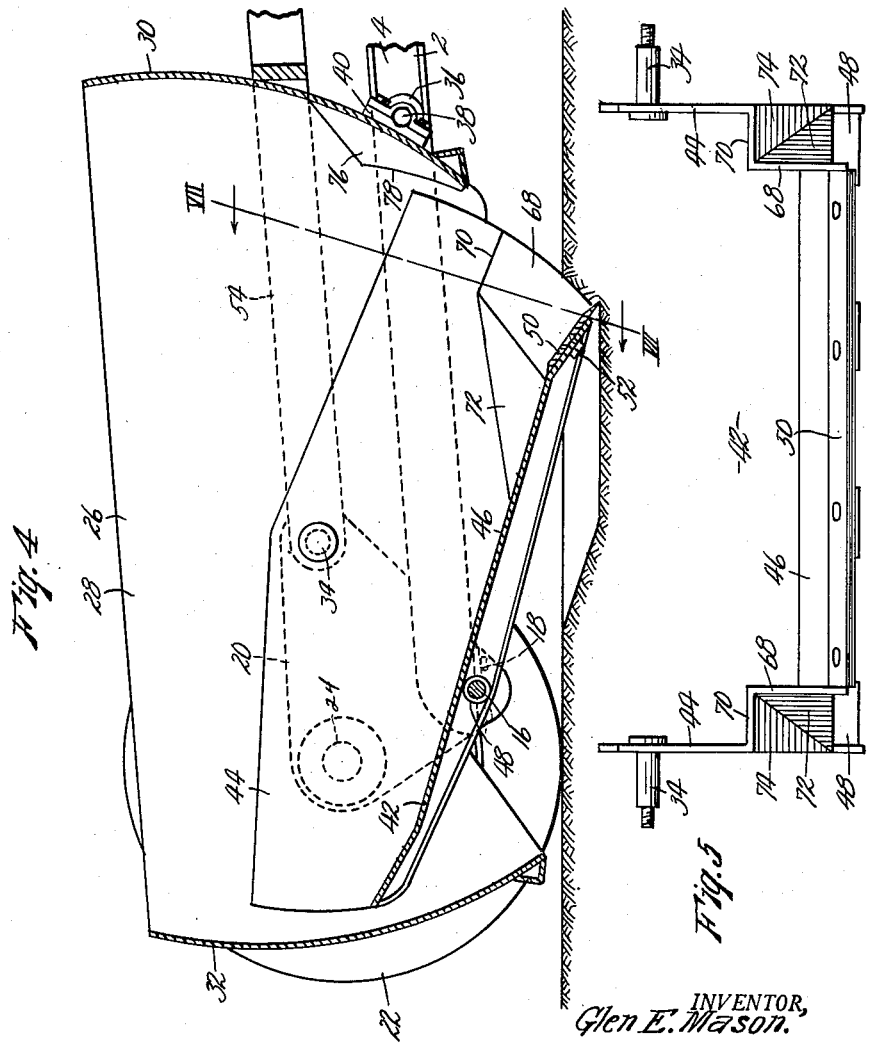

Patented Oct. 19, 1954

2,691,835

UNITED STATES PATENT OFFICE 2,691,835

EXCAVATING SCRAPER BOWL CONSTRUCTION

Glen E. Mason, Milan, Mo., assignor to Henry Manufacturing Company, Inc., Topeka, Kans., a corporation of Kansas Application March 20, 1950, Serial No. 150,611

1 Claim. (Cl. 37—129)

This invention relates to new and useful improvements in scrapers, and has particular reference to a scraper adapted to be towed by a tractor or the like and to scrape up a load of earth, transport it to any desired point, and dump it. It is an improvement over the scraper shown in application Serial No. 952, filed January 7, 1948 by Albert R. Henry, now Patent No. 2,568,627, that application and this being under common ownership.

The principal object of the present invention is the provision of a scraper of the class described having a scraper pan which may be moved through the ground with less friction than heretofore possible, and which hence may move a larger quantity of earth in proportion to the power expended.

Another object is the provision of a scraper of the class described wherein the tendency of earth to pack solidly in the scraper pan is eliminated, thereby providing for easy dumping of earth therefrom. This is extremely important when working in clay soils or other sticky soils.

These objects are accomplished by making the scraper blade, which extends transversely across the forward edge of the scraper pan, somewhat shorter than the width of the pan, and by moving the immediately adjacent portions of the side walls of the pan inwardly to the ends of the blade. This provides that the earth, immediately after it has been cut by the blade, will pass out of the restricted forward portion of the pan into the wider rear portion. Thereupon the packed soil is allowed to break up. This also greatly reduces the friction of the earth on most of the side wall surfaces, thereby reducing the force required to pull the scraper through the earth.

Other objects are simplicity and economy of construction, efficiency and dependability of operation, and adaptability for use with a wide variety of earth moving implements of the scoop or scraper types.

With these objects in view, as well as other objects which will appear in the course of the specification, reference will be had to the drawing, wherein:

Fig. 1 is a plan view, partially broken away, of a scraper embodying the present invention, shown in the earth transporting position.

Fig. 2 is a fragmentary enlarged longitudinal section of the scraper as shown in Fig. 1.

Fig. 3 is an enlarged fragmentary plan view of the scraper.

Fig. 4 is a view similar to Fig. 2, showing the scraper in the digging position.

Fig. 5 is a front elevation of the scraper pan shown separate from the remainder of the scraper.

Fig. 6 is a fragmentary section taken on line VI—VI of Fig. 2.

Fig. 7 is a fragmentary section taken on line VII—VII of Fig. 4.

Like reference numerals apply to similar parts throughout the several views, and the numeral 2 applies to a draft yoke comprising a pair of parallel spaced apart side arms 4 formed of inwardly opening channel iron, a cross-bar 6 extending between the forward ends of said side arms, a tongue 8 connected at its rearward end to cross-bar 6, and a hitch plate 10 fixed to the forward end of said tongue. Said hitch plate may be pivotally secured to the drawbar 12 of a tractor or the like by bolt 14.

A shaft 16 extends transversely between the rearward ends of side arms 4, being carried rotatably in bearing 18 mounted on said side arms. On each of the outwardly extended ends of said shaft is rotatably mounted a substantially triangular plate 20. Said plates are disposed in parallel vertical planes at right angles to shaft 16, and said shaft engages each of said plates at one corner thereof. A ground engaging wheel 22 is carried for rotation on a stub axle 24 rigidly fixed to and extending outwardly from each of plates 20 adjacent a second corner thereof.

A substantially rectangular scraper bowl 26 open at top and bottom and having side walls 28, a curved forward wall 30, and a curved rear wall 32, is pivotally hung between support plates 20 by means of a pair of trunnion bolts 34. Each of said bolts passes through one of bowl side walls 28 substantially at the center thereof, and engages the adjacent support plate 20 substantially at the third corner thereof. Said trunnion bolts are coaxial, and bowl 26 pivots between side arms 4. Said bowl is maintained approximately horizontal at all times by a pair of rollers 36. Said rollers are carried rotatably on shafts 38 which are mounted in bearings 40 fixed to the outer surface of bowl forward wall 30. Said shafts extend transversely outwardly from the bowl, and rollers 36 are disposed respectively in the channels forming yoke side arms 4.

A scraper pan 42 having side walls 44 and bottom 46 is swung within bowl 26, the side walls 44 of said pan being pivotally supported on trunnion bolts 34. Bearing tubes 48 welded or otherwise secured to the lower surface of pan bottom 46 are carried pivotally on shaft 16. A blade 50 is fixed to the forward edge of pan bottom 46 by means of bolts 52, and extends transversely of said pan.

Bar members 54 are welded or otherwise rigidly secured to the outer surfaces of side walls 28 of bowl 26. Said bars converge forwardly of bowl 26, and are pivotally connected at 56 to a piston rod 58. Said piston rod extends forwardly and is operably carried by a hydraulic cylinder 60. Said hydraulic cylinder is pivotally connected at its tail to hitch plate 10 at 62. Said cylinder is of the double acting type, being provided with hydraulic connections 64 and 66 by means of which fluid may be delivered to either end of the cylinder.

The structure so far described is substantially similar to that of application Serial No. 952, and its operation is substantially as follows: Fig. 2 shows the scraper in the dirt carrying position. When hydraulic cylinder 60 is operated to move bowl 26 forwardly with respect to draft yoke 2, the forward movement of trunnion bolts 34 relative to shaft 16 causes support plates 20 to turn rotatively in their own planes in a clockwise direction as viewed in Figs. 2 and 4, and scraper pan 42, being effectively secured to said support plates, will be tilted forwardly as shown in Fig. 4, while bowl 26 is maintained upright by the engagement of rollers 36 in side arms 4. Blade 50 will thus be lowered to and below the ground level, as shown in Fig. 4, and forward movement of the scraper will cause pan 42 and bowl 26 to be filled with earth. When the scraper is full, cylinder 60 is operated to return the parts to the position shown in Fig. 2, and the earth may be carried to any point desired. When it is desired to dump the earth, cylinder 60 is operated to move bowl 26 rearwardly with respect to draft yoke 2. This rotates support plates 20 to tilt the scraper pan rearwardly until pan bottom 46 is substantially vertical, whereupon the earth may pass outwardly between the lower edge of bowl rear wall 32 and the rearward edge of pan bottom 46.

Difficulty has been experienced in dumping the earth as described above due to the tendency of the earth to pack very tightly between the side walls 44 of the scraper pan, gravity being insufficient to dislodge it. Also, the friction of the earth against the side walls 44 of the pan, which friction must be overcome to pull the scraper through the earth, places an undue load on the scraper pulling tractor, especially when the scraper is nearly full. The object of this invention is to overcome these difficulties, and this object is accomplished by offsetting inwardly the lower forward corner portions 68 of side walls 44 of scraper pan 42. Portions 68 are parallel with side walls 44, and provide an entry to the pan which is somewhat narrower than the distance between the side walls. Blade 50 extends only between offset wall portions 68. The upper edge of offset wall 68 is connected to side wall 44 by a wall 70. A wall 72 is connected to the rearward edge of wall 68 and is inclined outwardly to side wall 44, and a wall 74 is connected to the rearward edge of wall 70 and is inclined downwardly to pan bottom 46.

As shown in Fig. 4, offset wall portions 68 are the only portions of the pan walls to go below the ground level, and since they are parallel with the direction of travel they pass through the ground easily. As the earth cut by blade 50 passes rearwardly from offset wall portions 68, it passes into the wider space between side walls 44. This permits the earth to loosen or break up somewhat, and reduces the packing of the earth in the scraper and thus permits easier dumping and permits the scraper to be pulled with less expenditure of power. The particular contour of the side wall offsets is of course somewhat a matter of choice, so long as said offsets are formed in such a manner that earth enters the scraper through a restricted throat.

It will be noted in Figs. 2 and 4 that front wall 30 of the scraper bowl is bowed forwardly from the forward end of the scraper pan. This provides a greater capacity, but at the same time provides a possibility that earth will fall out of the scraper through the openings outside of offset walls 68 and below walls 70, while earth is being transported. To prevent this a filler block 76 is fixed in each of the lower forward corners of the scraper bowl. As best shown in Figs. 2 and 4, the rearward surface 78 of each of said blocks is substantially coextensive with the openings caused by offsets 68, and are closely adjacent said openings when the scraper pan is in its carrying position.

Thus it is apparent that my invention produces a scraper having valuable advantages. The invention is extremely simple, and adds very little to the cost of the scraper. Nonetheless, it eliminates the packing of earth in the scraper and provides that it will dump freely without assistance. Furthermore, it provides a substantial reduction in the power required to pull the scraper through the earth.

While I have shown a specific embodiment of my invention, it is apparent that many minor changes in construction and operation could be made without departing from the spirit of the invention.

What I claim as new and desire to protect by Letters Patent is:

A scraper comprising a bowl open at top and bottom and having side, front, and rear walls, and adapted to be drawn forwardly, means for supporting said bowl above the ground, a scraper pan carried in the lower portion of said bowl for pivotal movement on an axis at right angles to the direction of travel of the scraper, said pan comprising a bottom normally forming a floor for said bowl and parallel side walls adjacent the side walls of said bowl, the lower forward portions of said pan side walls being offset inwardly, a blade secured to the forward edge of said pan bottom and extending between said offset side wall portions, filler blocks fixed in the forward corners of said bowl, said blocks being substantially coextensive with and closely adjacent the offsets of said pan side walls when said pan is in its normal position, and means for tilting said pan forwardly to bring said blade and portions of said side wall offsets beneath the ground level.

References Cited in the file of this patent

UNITED STATES PATENTS

| Number | Name | Date |
|---|---|---|
| 2,208,128 | Holbrook et al. | July 16, 1940 |
| 2,262,283 | Henry et al. | Nov. 11, 1941 |
| 2,334,460 | Weimer | Nov. 16, 1943 |
| 2,495,336 | Le Tourneau | Jan. 24, 1950 |

FOREIGN PATENTS

| Number | Country | Date |
|---|---|---|
| 421,254 | Germany | Nov. 9, 1925 |